United States Patent [19]

Baker et al.

[11] 4,121,509
[45] Oct. 24, 1978

[54] CONTROLLED ATMOSPHERE BROILER

[75] Inventors: Edward D. Baker, San Francisco; John S. Brown, Half Moon Bay; Robert B. Forney, Sausalito; Nils Lang-Ree, Los Altos, all of Calif.

[73] Assignee: N.P.I. Corporation, Burlingame, Calif.

[21] Appl. No.: 758,025

[22] Filed: Jan. 10, 1977

[51] Int. Cl.² .................. A47J 37/04; A47J 37/08
[52] U.S. Cl. ........................ 99/386; 99/401; 99/443 C; 99/447
[58] Field of Search ............... 99/386, 339, 391, 361, 99/393, 362, 401, 367, 340, 443 C, 352, 447; 198/952

[56] References Cited

U.S. PATENT DOCUMENTS

| 2,454,370 | 11/1948 | Beaubien | 99/386 |
| 3,518,934 | 7/1970 | Davis | 99/443 C |
| 3,674,504 | 7/1972 | Lane | 99/443 C |
| 3,943,841 | 3/1976 | Huang | 99/352 |

Primary Examiner—Harvey C. Hornsby
Assistant Examiner—Timothy F. Simone
Attorney, Agent, or Firm—Lothrop & West

[57] ABSTRACT

A controlled atmosphere broiler has a horizontal tunnel mounted on a frame and enclosing one run of a continuous, open-work conveyor traveling from an inlet end toward an outlet end. An air fan near the inlet end supplies air through a supply air duct to nozzles near the outlet end and discharging into the tunnel, both from above and from below, toward the conveyor. The supply air duct air is heated and provided with hot water vapor. The air is further heated by infrared heaters in the tunnel above and below the conveyor. Infrared radiation is reflected toward the conveyor by a reflector, preferably a common wall between the tunnel and the supply air duct. Air from the tunnel is aspirated through a return air duct by the fan. There is a damper control vent from the tunnel to the atmosphere, and air flow in the supply air duct is also controlled by a damper. The conveyor is supported by water-cooled cross tubes, and there is a drain pan below the conveyor.

3 Claims, 3 Drawing Figures

CONTROLLED ATMOSPHERE BROILER

BRIEF SUMMARY OF THE INVENTION

For the cooking of large quantities of materials such as meat patties and the like, there is provided a tunnel through which one run of a continuous conveyor operates in order to carry the patties through the tunnel from an inlet end to the outlet end thereof. Within the tunnel the patties are subjected to radiation from infrared heaters and are likewise subjected to the effects of hot air blown from a fan through a supply duct and through groups of nozzles onto the patties both above and below the conveyor. The air traveling in the air duct is likewise supplied with steam or hot water vapor or comparable moisture to control its humidity. There may be a common wall between the air duct and the tunnel so that the wall acts in part as a heat conductor and in part as a reflector for the infrared radiators. Air traveling through the tunnel is withdrawn therefrom near the entrance end by a return air duct leading to the fan so that there is substantial air recirculation. There is a damper controlled vent from the tunnel directly to the atmosphere. By the use of this mechanism including three different types of heat supply; that is to say, direct infrared radiation, warm air and water vapor of the character of steam, it is possible to provide a quickly cooked patty having a relatively high moisture content and to do so uniformly, in a short time and automatically.

DETAILED DESCRIPTION

Figure 1:
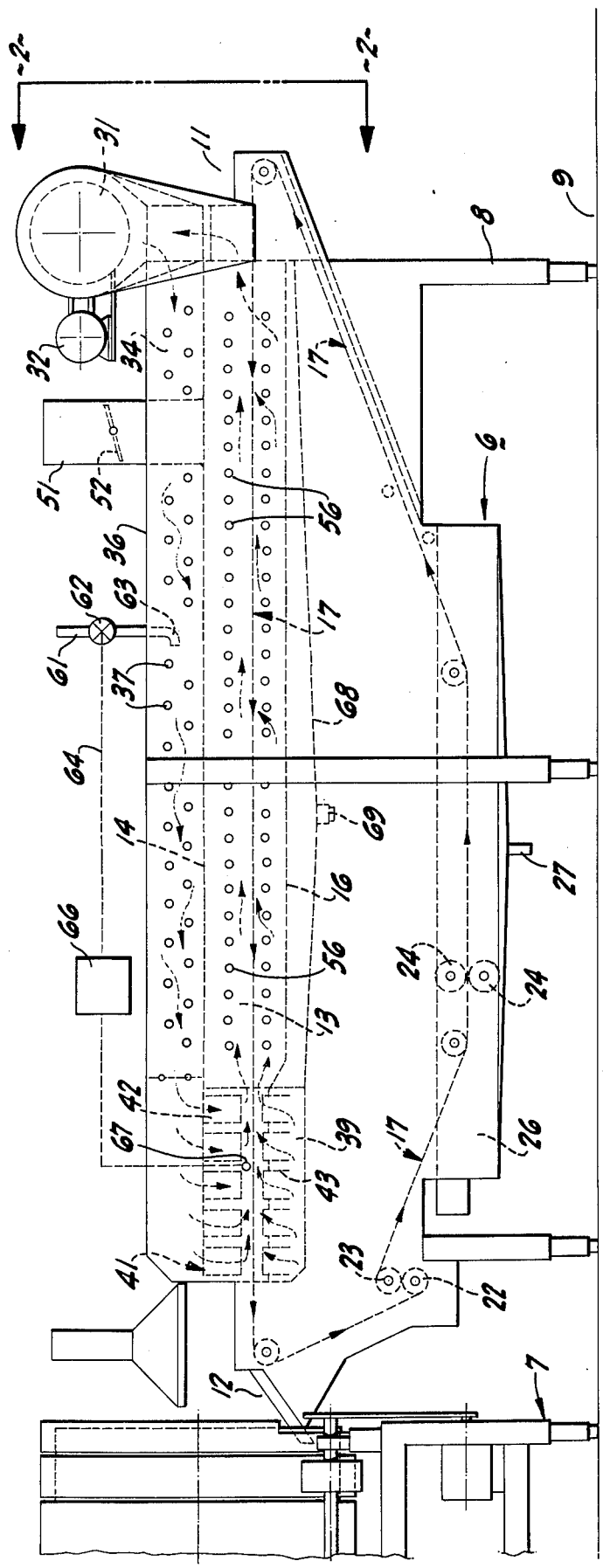
FIG. 1 is a side elevation of a machine constructed pursuant to the invention as it is utilized to supply a subsequent processing machine.

While the controlled atmosphere broiler pursuant to this disclosure can be utilized in connection with various different articles requiring cooking, it is especially utilized for broiling items such as hamburger patties that are required in relatively large quantities and are required to have quite a uniform consistency and finish. It is highly desirable that the patties when cooked are relatively moist and that due to cooking they lose relatively small amounts of their initial weight. It is also desirable to have the broiling or cooking take place so that the patties are all quickly and uniformly treated despite their positions in the machine and so that they are handled relatively little and almost entirely automatically.

It is therefore the object of the invention to satisfy all of those requirements as well as to provide an improved device for affording an improved product.

The presently preferred machanism is a controlled atmosphere cooker, generally designated 6, which can utilized as an initial machine alone or in connection with an additional machine or machines 7 for providing extra finish or additional qualities to the product, the extra machine not being consequential herein but being shown to illustrate a series operation.

The cooking device itself includes a frame 8 made of the customary shapes and forms resting on a support 9 and extending from an inlet end 11 to an outlet end 12. On the frame is arranged a horizontally extending cooking tunnel 13. This is an elongated, generally rectangular enclosure open at the inlet end 11 and at the outlet end 12 but otherwise substantially closed and partly defined by an upper common wall 14 and a lower common wall 16.

Arranged on the frame in an appropriate fashion is a continuous conveyor 17. This preferably is a flexible, openwork, belt-like member made up of a plurality of closely associated, cross rods 19 side connected and arranged with spaces 21 therebetween. The belt is advanced in the direction of the arrows shown in FIG. 1 by a drive motor connected to a drive pulley 22, tension in the conveyor being maintained by an idler pulley 23. The positioning of the belt or conveyor is such that the upper run is substantially horizontal and is disposed substantially midway of the height of the tunnel 13.

The frame has an open feed area adjacent the inlet end 11 so that items to be cooked, such as hamburger patties, can be deposited by any appropriate means on the upper run of the conveyor 17 and will be carried throughout the length of the tunnel and discharged at the outlet end 12. The return run of the conveyor extends downwardly through a lower portion of the frame and through a pair of cleaning brushes 24. In the same region on the frame is an open-topped enclosure 26 for receiving or catching any debris and liquids such as water and fat. A drip drain 27 is provided so that the chain is cleaned at least once for each circuit and can be maintained clean at all times.

Figure 2:
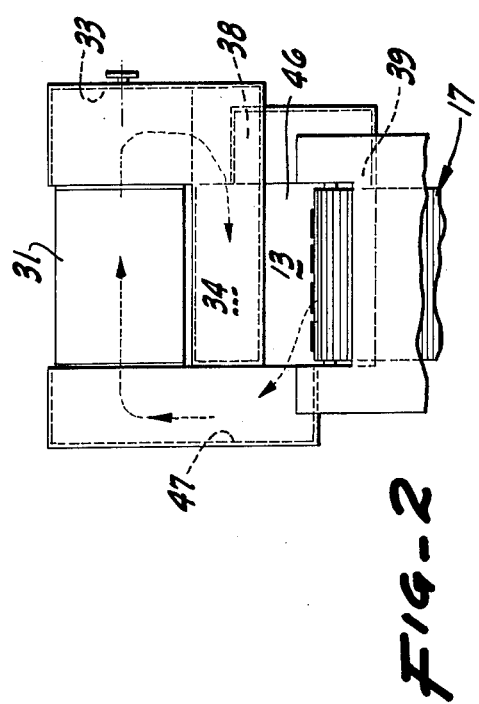
FIG. 2 is a cross-section of the machine itself, the plane of section being indicated by the line 2—2 of FIG. 1 and various parts of the device being broken away to reduce the figure size.
Figure 3:
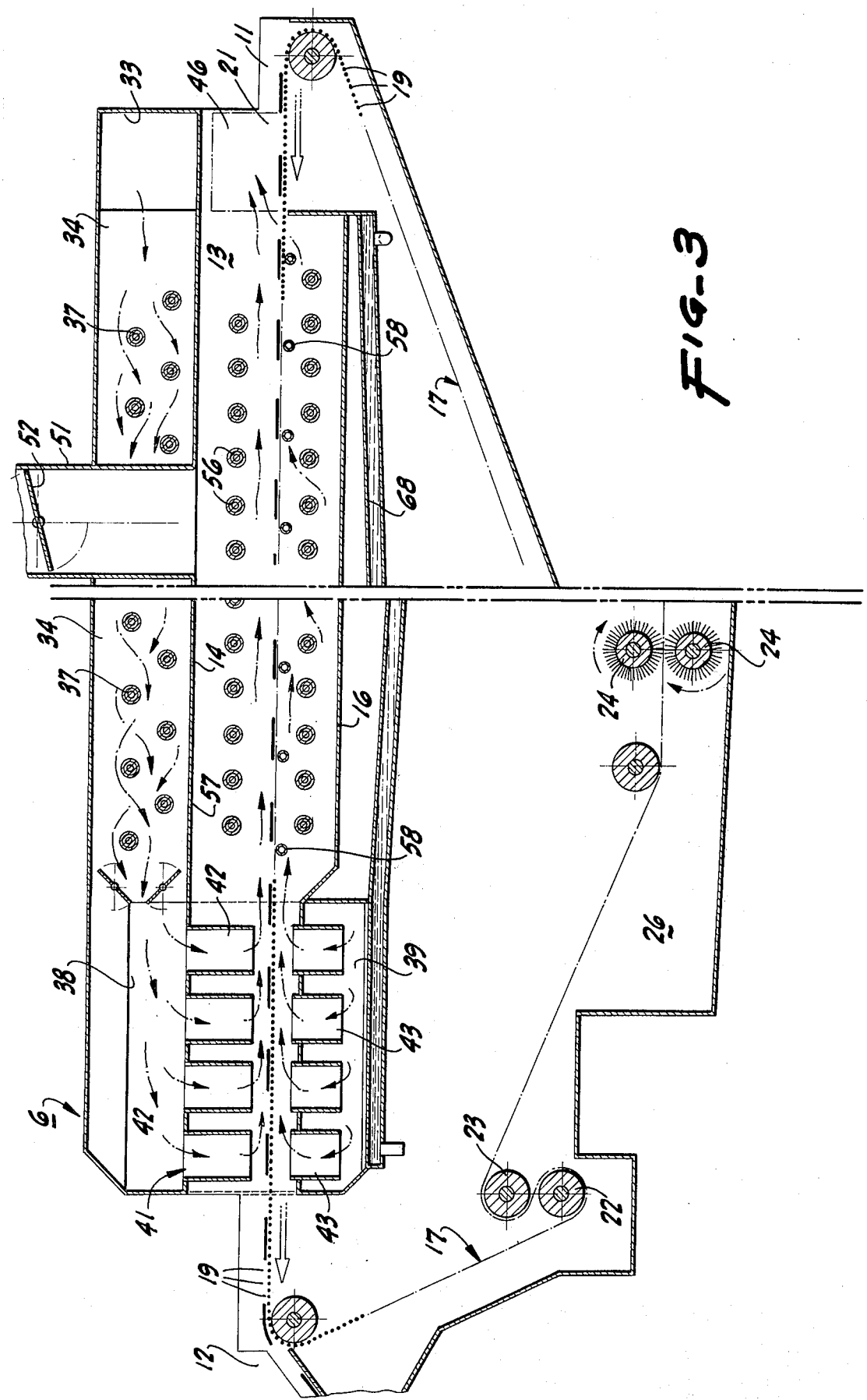
FIG. 3 is a cross-section on a longitudinal, vertical plane throughout the length of the machine, certain portions being broken away and some portions being illustrated diagrammatically.

In accordance with the invention, means are provided for forcing circulation of air around and over the upper run of the conveyor so as to establish a predetermined atmosphere around the items being cooked. For that reason there is mounted on the frame 8 an axial flow blower fan 31 driven by a motor 32 and effective to discharge air, as shown in FIG. 2, into a plenum 33 having an outlet discharging into an air supply duct 34 formed between the common wall 14 of the tunnel and a top wall 36 on the frame. There are also approriate sides to the air supply duct 34. There is consequently furnished a current of air traveling in the direction of the arrows in FIG. 1. This air is subjected to heating by a number of heaters 37 arranged in the air supply duct and preferably electrically energized so that the air traveling through the upper supply duct 34 is raised substantially in temperature.

Leading from the downstream end of the air duct 34 are lateral passageways 38 extending around the tunnel and merging with a lower air duct 39. Establishing openings between the air ducts and the tunnel are a number of nozzles 41. These nozzles can be of any suitable sort and preferably are of the nature shown in the co-pending application of John S. Brown and Robert B. Forney entitled "Patty Finishing Cooker" and filed Jan. 7, 1977 with Ser. No. 757,745. The nozzles are arranged in an upper group 42 and a lower group 43 so that they face toward each other and discharge air toward and substantially normal to the plane of the conveyor 17. Thus, any items of food on the conveyor are subjected on opposite sides or on top and bottom to jets of air that have been similarly heated so that all of the units being cooked are uniformly treated.

Relatively warm air which is discharged from the two groups of nozzles travels in a reverse direction back toward the inlet end 11 through the tunnel 13 and then travels, as shown particularly in FIG. 2, through an air discharge duct 46 and through a lateral duct 47 into the axial inlet of the blower fan 31 for recirculation, the described path being taken over and over by the circulating air. This conserves energy by repeatedly reusing much of the heated air.

While the greater bulk of the air is recirculated as described, there are some exceptions in that at the inlet end 11 there is communication with the atmosphere. Since the suction side of the fan is in that area, there is some addition of atmospheric air at this point. Furthermore, the tunnel 13 is open at the outlet end 12 so that there can be some small loss of warm air somewhat elevated in pressure, but the addition of air and the escape of air are relatively minor. The main diversion of the air in circulation is through a vent 51 opening to the interior of the tunnel not far from the inlet end 11 and discharging to the atmosphere. The amount of flow through the vent, however, is under control of a damper 52, which can be completely shut off or can be opened in varying amounts to govern the character of air flowing in the tunnel.

In addition to cooking the units on the conveyor by means of the enveloping or ambient warmed air, there are provided in the tunnel itself a number of radiant heating elements 56, preferably electrically heated rods at a temperature to afford adequate infrared radiation. Some of this radiation is directed immediately onto the items on the conveyor, whereas other radiation from the elements 56 is reflected back into the tunnel by a bright finish 57 on the bottom of the common wall 14. A similar bright finish is provided on the adjacent side of the lower tunnel wall 16 so that substantially all of the radiation from the infrared units either directly or by relection is directed onto the items on the conveyor. The common wall 14 allows air heating from the higher temperature in the tunnel.

The temperatures are such that particular provision is made for handling the conveyor within the tunnel. At appropriate intervals throughout its length there extend across the tunnel just below the conveyor a number of tubes 58 connected into a cool water circulating systems, not shown. The tubes are in position physically to support the conveyor chain at frequent intervals but are maintained at a satisfactory temperature by the water circulating through them. The spaces between the chain elements are small enough so that the chain elements are easily supported on the various tubes 58 but are large enough to admit of a large amount of infrared radiation onto the patties or like units on the conveyor.

Not only are the patties partially cooked by ambient warm air and also by infrared radiation, but additionally the atmosphere is controlled to govern the moisture while the patties are being cooked. There is provided in the upper part of the frame 8 and extending from a source of water vapor or steam, not shown, a conductor 61 leading through a control valve 62 into a nozzle manifold 63 in the air duct 34. When the valve 62 is open, water vapor such as steam substantially saturated or of relatively high quality is ejected from the nozzle manifold 63 and joins the warm air traveling to the nozzle groups. The valve 62 is preferably connected by a lead 64 to a control mechanism 66 having a sensor 67 in the vicinity of the nozzle outlets so that a controlled addition of moisture is afforded. Much of the moisture recirculates with the recirculating air, but some of it condenses and deposits. For that material there is a drain pan 68 disposed just below the tunnel 13 and having the common wall 16 between them. Any moisture which falls out of the air, especially in the region of the nozzles, is caught by the drain pan 68 from which it can be released through a drain opening 69.

With this mechanism, uncooked or partially cooked items such as hamburger patties can be fed into the outlet end 11 and are advanced uniformly through the tunnel, being therein subjected to a heated atmosphere having a controlled humidity due to the addition of water vapor or steam. In such atmosphere the patties are simultaneously cooked on both sides, not only by the hot air that flows through the tunnel from the nozzles at the end of the air duct 34 but also by the direct radiation and reflected radiation emanating from the infrared units 56. By the time the patties arrive on the conveyor adjacent the nozzle groups, they are well cooked and colored. Their passage through the nozzle groups is such that if the air temperature is sufficiently high, and that usually is preferred, the patties on both sides are finally colored and may be given marks or striations as set forth in the above-identified patent application. The cooked and marked patties are then discharged from the outlet 12 for further handling or immediate use.

We claim:

1. A controlled atmosphere broiler comprising an elongated frame; means on said frame and including a first elongated, heat conducting common wall and a second elongated, heat conducting common wall defining a substantially closed, elongated cooking tunnel open at an inlet end and at an outlet end; a continuous conveyor having an upper run and a lower run; means mounting said conveyor on said frame for movement of said upper run of said conveyor through said tunnel from said inlet end toward said outlet end; a plurality of infrared heating elements in said tunnel above and below said upper run and between said upper run and said common walls, respectively, whereby said walls will reflect heat from said elements toward said upper run; an elongated supply air duct extending longitudinally of said cooking tunnel, one longitudinal side wall of said duct being said first common wall whereby heat may be transferred and conserved by condution through said first common wall between said cooking tunnel and said air duct; air heaters in said supply air duct; air jet nozzles adjacent said outlet end communicating with said supply air duct and with said tunnel and directed toward said upper run; a fan on said frame; means connecting said fan to discharge air into said supply air duct and to aspirate air from said tunnel adjacent said inlet end; and means for introducing moisture into said supply air duct in the vicinity of said air heaters therein.

2. A device as in claim 1 including means for supporting said upper run including water-cooled supports spanning said frame.

3. A device as in claim 1 in which said air jet nozzles are arranged in two groups one above and discharging downwardly toward said conveyor and the other below and discharging upwardly toward said conveyor, said two groups being disposed in substantial vertical alignment.

* * * * *